United States Patent [19]

Sano et al.

[11] Patent Number: 4,841,563
[45] Date of Patent: Jun. 20, 1989

[54] BUCKET TYPE COIN ACCUMULATION APPARATUS

[75] Inventors: Yoshii Sano; Hideo Totsu; Toshiharu Morihisa, all of Tokyo, Japan

[73] Assignee: Tamura Electric Works, Ltd., Tokyo, Japan

[21] Appl. No.: 135,006

[22] Filed: Dec. 18, 1987

[30] Foreign Application Priority Data

Jan. 12, 1987 [JP] Japan .................................. 62-3271

[51] Int. Cl.⁴ .......................................... H04M 17/02
[52] U.S. Cl. .................................. 379/150; 194/203; 194/346
[58] Field of Search ............... 379/150, 155, 132, 152, 379/153; 194/203, 346, 350

[56] References Cited

U.S. PATENT DOCUMENTS 3,260,338 7/1966 La Barge ............................ 379/150
4,136,262 1/1979 Clark ................................. 379/155

FOREIGN PATENT DOCUMENTS 42-10246 6/1967 Japan .

Primary Examiner—Stafford D. Schreyer
Attorney, Agent, or Firm—Remy J. VanOphem

[57] ABSTRACT

A bucket type coin accumulation apparatus includes a collection plate, a return plate, locking members, weights, and photodetectors. The collection and return plates constitute a bottom portion of a coin accumulation bucket and cooperate to randomly accumulate coins in the coin accumulation bucket. The locking members independently lock the collection and return plates when a coin is inserted. The weights independently urge the collection plate and the return plate in a counter-gravity direction by a biasing force smaller than the weight of one coin. The photodetectors detect whether the collection and return plates are located at home positions where the collection and return plates are biased by the weights. One of the collection and return plates is released by the weight of the accumulated coin upon selective unlocking of the locking members, and the presence/absence of coin accumulation is discriminated by an output from the photodetectors.

9 Claims, 6 Drawing Sheets

BUCKET TYPE COIN ACCUMULATION APPARATUS

BACKGROUND OF THE INVENTION

1. Field of the Invention

The present invention relates to a bucket type coin accumulation apparatus.

2. Description of the Prior Art

A conventional bucket type coin accumulation apparatus is used in coin storing type public telephone sets and various automatic vending machines. As disclosed in Japanese Patent Publication No. 42-10246, the bottom portion of the coin accumulation bucket is defined by a collection plate and a return plate as well as locking means for these plates which selectively unlock to pivot the collection or return plate downward by the weight of a coin. Therefore, the coin is collected or returned.

In a conventional bucket type coin accumulation apparatus as described above, the collection and return plates are selectively located at two positions, i.e., the collection position and the return position. Whether coins are actually accumulated in the accumulation bucket cannot be directly identified. Coin accumulation is indirectly discriminated using a discrimination output from a coin discriminator prior to coin accumulation. According to this discrimination technique, an illegal action such as a coin being tied to one end of a string for reuse, cannot be prevented. In addition, the incomplete operation states of the collection or return plate cannot be detected.

SUMMARY OF THE INVENTION

It is, therefore, a principal object of the present invention to provide a bucket type coin accumulation apparatus which can directly detect whether coins are accumulated in a bucket.

It is another object of the present invention to provide a bucket type coin accumulation apparatus which can discriminate incomplete collection or return of a coin and complete restoration of the collection and return plates.

In order to achieve the above objects of the present invention, there is provided a bucket type coin accumulation apparatus consisting of a collection plate and a return plate, both of which constitute a bottom portion of a coin accumulation bucket and cooperate to randomly accumulate coins in the coin accumulation bucket and locking means for independently locking the collection plate and the return plate when a coin is inserted. Biasing means are provided for independently urging the collection plate and the return plate in a counter-gravity direction by a biasing force smaller than a weight of one coin and for causing the collection and return plates to remain at home positions. The apparatus also includes detecting means for detecting whether the collection plate and the return plates are located at the home positions of the collection plate and the return plate defined by biasing by the biasing means, wherein one of the collection plate and the return plate is released by the weight of the accumulated coin upon selective unlocking of the locking means to selectively collect or return the accumulated coin, and the presence/absence of coin accumulation is discriminated by an output from the detecting means.

DETAILED DESCRIPTION OF THE PREFERRED EMBODIMENT

A preferred embodiment of the present invention will be described in detail with reference to the accompanying drawings.

Figure 2:
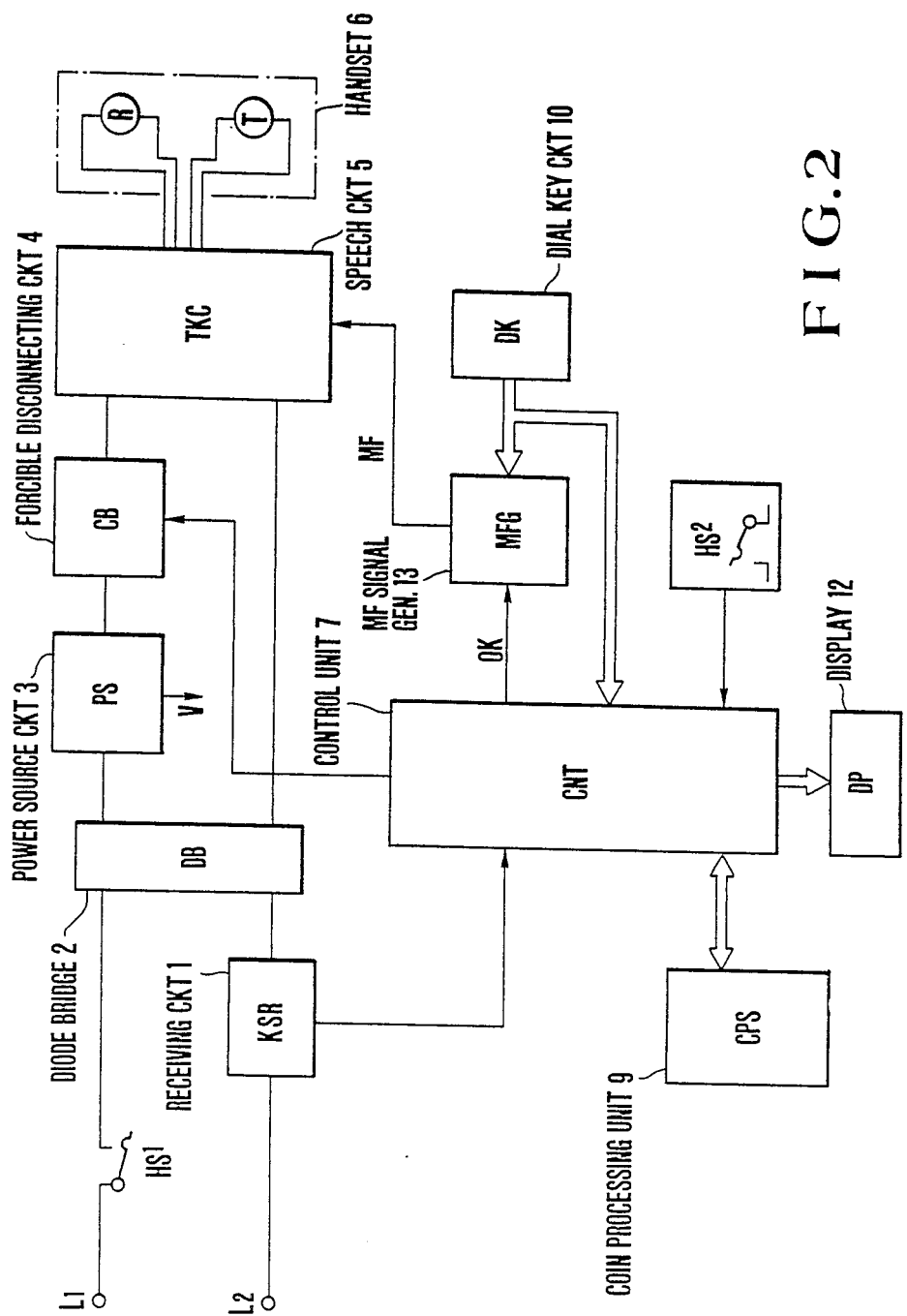
FIG. 2 is a block diagram of a public telephone set.

FIG. 2 is a block diagram of a public telephone set. Referring to FIG. 2, a speech circuit (to be referred to as a TKC hereinafter) 5 which forms a communication loop and has transmitting and receiving amplifiers is connected to line terminals $L_l$ and $L_2$ to which telephone lines from an exchange are connected, through a hook switch $HS^1$, a receiving circuit (to be referred to as a KSR hereinafter) 1, a diode bridge (to be referred to as a DB hereinafter) 2, a power source circuit (to be referred to as a PS hereinafter) 3, and a forcible disconnecting circuit (to be referred to as a CB hereinafter) 4. A transmitter T and a receiver R of a handset 6 are connected to the speech circuit 5.

A control unit (to be referred to as a CNT hereinafter) 7 consisting of a processor (to be referred to as a CPU hereinafter) such as a microprocessor, a memory, and the like, is provided to perform determination in accordance with outputs from the KSR 1, a coin processing unit (to be referred to as a CPS hereinafter) 9 which performs coin discrimination and collection, a dial key circuit (to be referred to as a DK hereinafter) 10, a hook switch $HS^2$, and the like, thereby controlling the CPS 9, a display (to be referred to as a DP hereinafter) 12, an MF signal generator (to be referred to as an MFG hereinafter) 13 for generating an MF signal, the TKC 5, the CB 4, and the like.

Note that the MFG 13 is operated in response to an output from the DK 10 and is controlled by the CNT 7. That is, only when an enable signal OK is supplied from the CNT 7, the MFG 13 generates an MF signal according to an operation of the DK 10 and supplies a control signal CS to the TKC 5 so that the MF signal is sent as a dial signal through the TKC 5.

When the hook switch $HS^1$ is turned on by an off-hook operation to close a DC loop through the TKC 5 and a loop current of a predetermined polarity is supplied by the DB 2, the PS 3 charges a capacitor by this loop current and supplies a terminal voltage of the capacitor as a power source voltage V to the respective units.

Therefore, if a preloop method is adopted, the DC loop is closed by the off-hook operation and the CNT 7 outputs the enable signal OK in accordance with an output supplied from the CPS 9 upon insertion of coins. As a result, dialing by the DK 10 is enabled to allow communication upon a called party response.

However, even if a called party responds, when a rate signal such as a reversing pulse arrives from an exchange, this signal is received by the KSR 1. A rate signal detection output is supplied to the CNT 7. The CNT 7 controls the CPS 9 to collect coins and each subsequent rate signal is received when the unit speech time has elapsed. Coins are collected again. When inserted coins are used up, the CNT 7 controls the CB 4 to open the DC loop for a predetermined time interval, thereby disengaging an exchange to forcibly disconnect the line.

The CNT 7 displays a coin insertion request, a shortage of coins, and an out-of-order caused by an abnormal state of the coin accumulation condition.

Figure 1A:
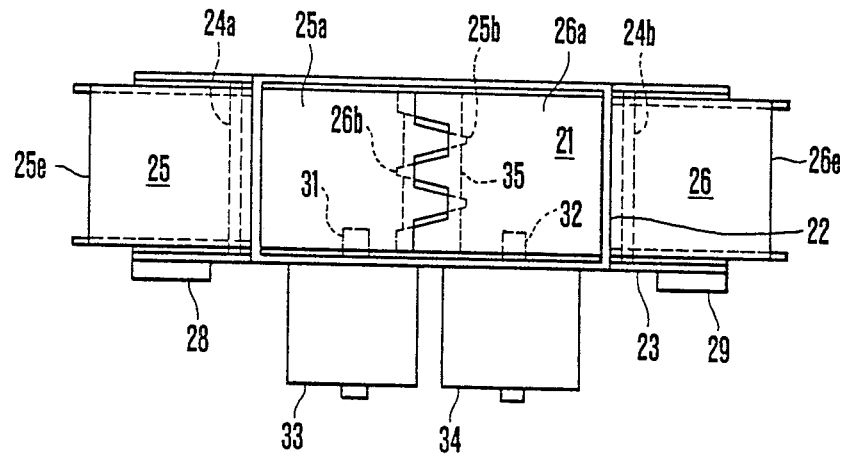
Figs. 1A and 1B, are a plan view and a side view, respectively, of a bucket type coin accumulation apparatus according to an embodiment of the present invention.
Figure 1B:
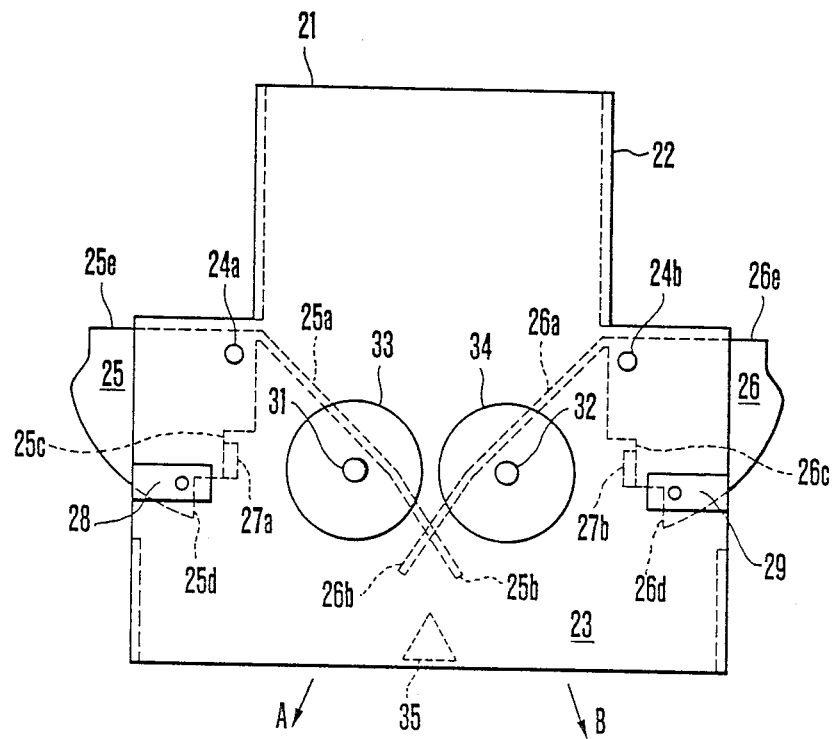

FIG. 1A is a plan view of a bucket type coin accumulation apparatus arranged in the CPS 9 and FIG. 1B is a side view of the apparatus. A collection plate 25 and a return plate 26 are respectively pivotally supported by shafts 24a and 24b inside a frame 23 integrally formed with a box-like pocket 22 having an upper opening 21. Extended portions 25a and 26a of the collection and return plates 25 and 26 extend downward such that fork-like distal ends 25b and 26b cross each other. The collection plate 25 and the return plate 26 cooperate with the pocket 22 to constitute a coin accumulation bucket and define the bottom portion of the bucket. End portions of the collection and return plates 25 and 26 at positions opposite to the extended portions 25a and 26a extending through the shafts 24a and 24b have respectively, steps 25c and 25d and steps 26c and 26d all of which face inward. The side portions of these opposite end portions are bent downward. Each opposite end portion is heavier than the corresponding extended portion side by a weight smaller than the weight of the lightest coin to serve as counterweights 25e and 26e. These counterweights 25e and 26e normally bias the extended portions 25a and 26a upward (FIG. 1B) and cause the steps 25c and 26c to abut against stoppers 27a and 27b in the frame 23.

First and second detectors 28 and 29 constitute pairs of light-emitting diodes (to be referred to as LEDs hereinafter) and phototransistors (to be referred to as PRTs hereinafter) which are arranged to oppose each other toward the central portion of the frame 23 through the counterweights 25e and 26e of the steps 25d and 26d, respectively. When portions of the counterweights 25e and 26e near the steps 25d and 26d shield the optical paths between the pairs of LEDs and PRTs, the PRTs are kept off. When coins are accumulated on the collection and return plates 25 and 26 and the extended portions 25a and 26a are pivoted downward (FIG. 1B) against the biasing forces of the counterweights 25e and 26e, the steps 25d and 26d are retracted from the optical paths and the PRTs are turned on. Therefore, coin accumulation can be detected, and at the same time the CNT 7 can detect whether the collection and return plates 25 and 26 are set in the home positions.

A collection magnet (to be referred to as a CM hereinafter) 33 and a return magnet (referred to as an RM hereinafter) 34 are arranged outside the frame 23. The CM 33 includes a plunger 31 corresponding to the collection plate 25, and the RM 34 includes a plunger 32 corresponding to the return plate 26. When the collection plate 25 and the return plate 26 are kept in the home positions, i.e., a nonaccumulation state, the plungers 31 and 32 extend through the frame 23 and are located below the extended portions 25a and 26a with a narrow gap. When the collection plate 25 and the return plate 26 are pivoted downward because of coin accumulation, the lower surfaces of the collection and return plates 25 and 26 abut against the plungers 31 and 32, respectively, and are locked at the abutment positions. However, during coin accumulation, the portions near the steps 25d and 26d of the counterweights 25e and 26e are retracted from the optical paths of the detectors 28 and 29, respectively.

During coin accumulation, the CM 33 or RM 34 is selectively energized in accordance with coin collection or return. The collection plate 25 or the return plate 26 is pivoted downward about the shaft 24a or 24b by the weight of the coin. In other words, the extended portion 25a or 26a is pivoted downward. The coin path direction is determined by a selector 35 disposed below the extended portions 25a and 26a in the frame 23. Therefore, the coin is dropped in the collecting case in a direction indicated by arrow A or in the return port in a direction indicated by arrow B.

Energization of the CM 33 or the RM 34 requires a large current. When the CM 33 or the RM 34 is energized by the PS 3 shown in FIG. 2, the CM 33 or the RM 34 is preferably instantaneously energized and the plunger 31 or 32 is immediately returned to the home position. The coin is collected or returned, and the same energization operation described above is repeated to set the collection or return plate 25 or 26 in the home position.

Figure 3A:
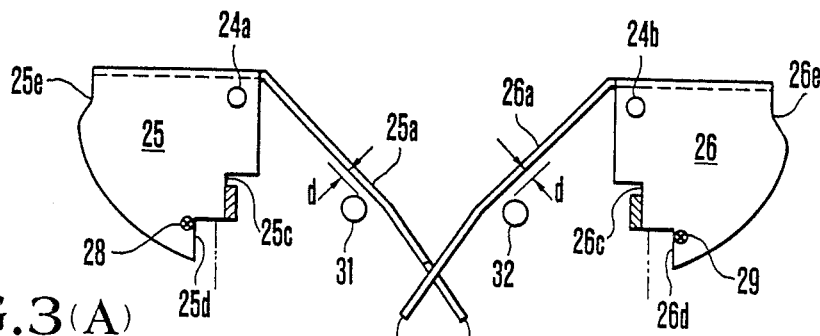
FIGS. 3A to 3D are side views of the main part for explaining the operating states of a collection plate and a return plate; and, FIGS. 4 to, 5B are flow charts for explaining the operation of the bucket type coin accumulation apparatus.
Figure 3B:
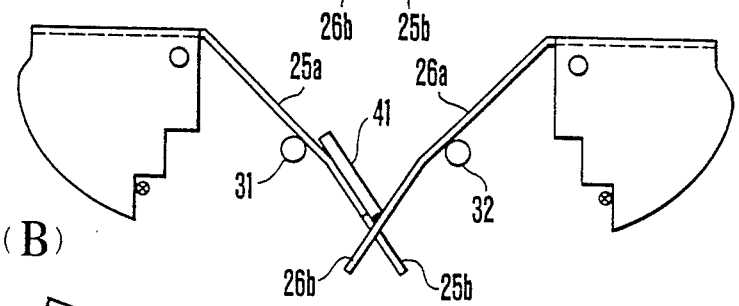

FIGS. 3A to 3D are side views of the main part to explain the operating conditions of the collection plate 25 and the return plate 26. In the nonaccumulation state shown in FIG. 3A, the extended portions 25a and 26a are urged in a counter-gravity direction by the biasing forces of the counterweights 25e and 26e in the same manner as in Figs. 1A and 1B. The nonaccumulation state provides a first position at which gaps d are formed between the plunger 31 and the extended portion 25a and between the plunger 32 and the extended portion 26a, respectively. In the accumulation state of a coin 41, as shown in FIG. 3B, the coin 41 drops in the recess defined by the extended portions 25a and 26a and the weight of the coin 41 acts on the extended portions 25a and 26a. Therefore, the extended portions 25a and 26a are moved to the second positions at which the extended portions 25a and 26a are in contact with the plungers 31 and 32, respectively.

In the collection state, the CM 33 is instantaneously energized to retract the plunger 31. The collection plate 25 is pivoted by the weight of the coin 41 and is moved to a third position shown in FIG. 3C. The coin 41 drops through an opening 42 formed between the pivoted collection plate 25 and the locked return plate 26, thereby collecting the coin 41.

When instantaneous energization of the CM 33 is completed and the plunger 31 returns to the home position, the upper surface of the extended portion 25a is brought into contact with the lower surface of the plunger 31 by the biasing force of the counterweight 25e. In this state shown in FIG. 3D, the CM 33 is similarly energized and the plunger 31 is retracted again. During energization of the plunger 31, the extended portion 25a is returned to the home position, thus restoring the state shown in FIG. 3A.

Figure 3C:
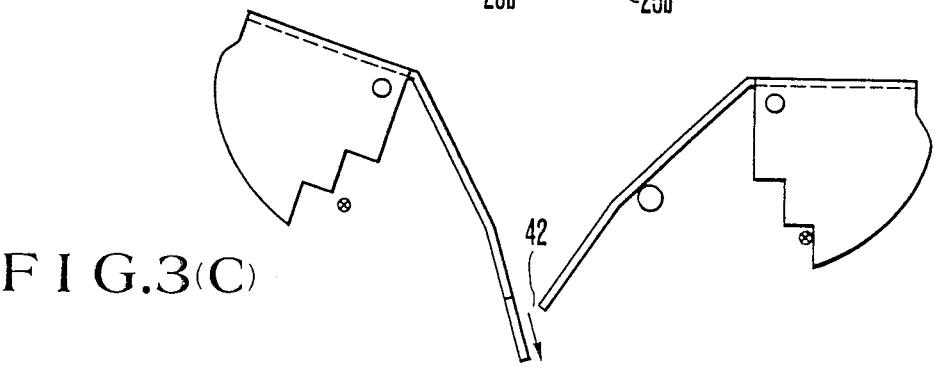
Figure 3D:
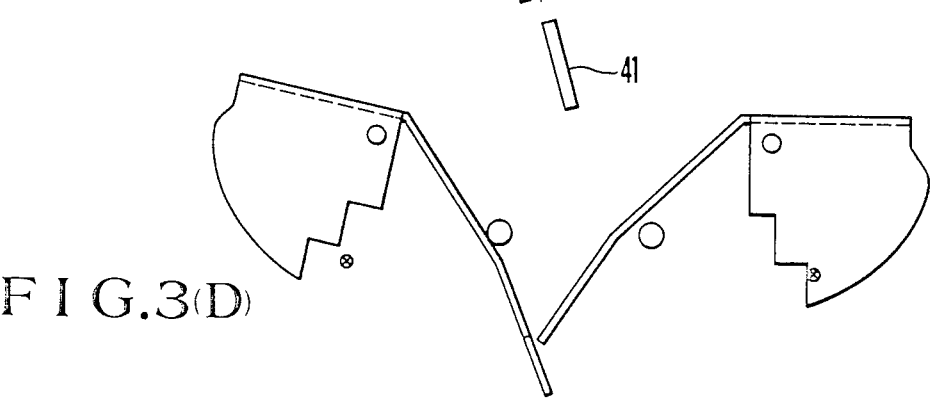

In the state shown in FIG. 3D, the return plate 26 is properly set in the home position and only the collection plate 25 does not return to the home position.

Both the PRTs in the detectors 28 and 29 are kept off in the state shown in FIG. 3A. Neither of the PRTs are kept off in the state in FIG. 3B. The operating states of the PRTs in the state of FIG. 3C are the same as those in FIG. 3B. The PRT in the detector 28 is ON and the PRT in the detector 29 is OFF in the state shown in FIG. 3D. As soon as the second spontaneous energization of the CM 33 is completed, the output states of the PRTs in the detectors 28 and 29 are detected in accordance with the above operating states. Therefore, the operating condition of the collection plate 25 can be accurately detected.

In the return state, the RM 34 is energized to operate the return plate 26 in the same manner as described above. The inverted output states of the PRTs in the detectors 28 and 29 are checked and the accurate operating state of the return plate 26 can be confirmed.

Figure 4:
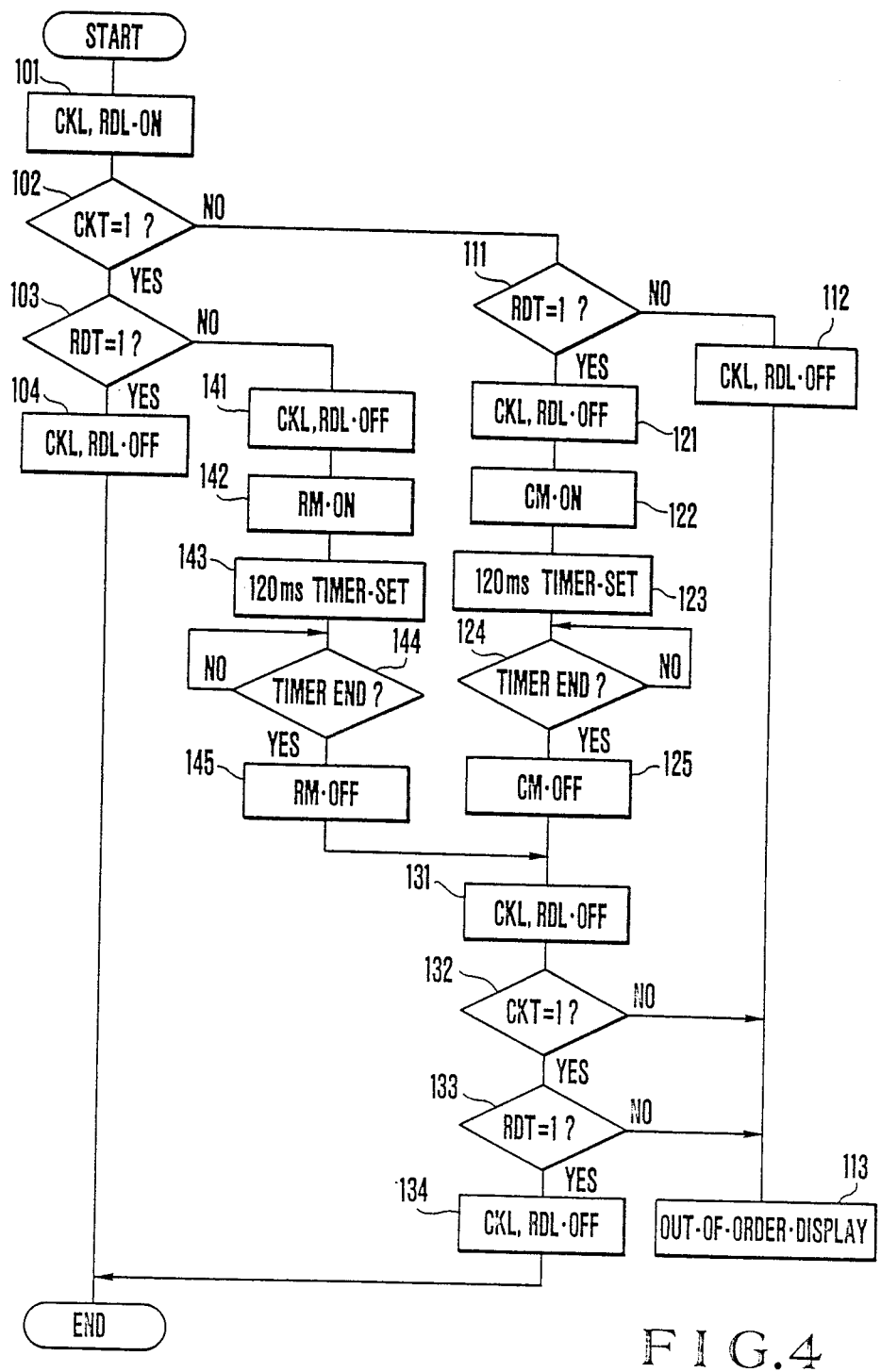

FIG. 4 is a flow chart of a self diagnosis program for the coin accumulation apparatus under the control of the CPU in the CNT 7. The LED (to be referred to as a CKL hereinafter) in the detector 28 and the LED (to be referred to as an RDL hereinafter) in the detector 29 are turned on and then off. A voltage is applied to the collectors of the PRT (to be referred to as a CKT hereinafter) in the detector 28 and the PRT (to be referred to as an RDT) in the detector 29 through corresponding resistors. Changes in collector potentials corresponding to the ON and OFF states of the CKT and the RDT are monitored. The ON state is determined as logic "0", and the OFF state is determined as logic "1". Energization and deenergization of the CM 33 and the RM 34 are controlled as "ON" and "OFF" operations.

The CKL and the RDL are turned on by "CKL,RL ON" in step 101. The CPU checks "CKT=1?" in step 102. If Y (YES) in step 102, the collection plate 25 is returning to the home position. The CPU then checks "RDT=1?" in step 103. If Y in step 103, the return plate 26 is returning to the home position and no failures are detected. The CPU performs "CKL,RDL OFF" in step 104 to stop energizing the CKL and the RDL. Therefore, a series of self diagnosis operations are completed.

If N (NO) in step 102, the collection plate 25 is held in one of the states shown in FIGS. 3B to 3D. The CPU checks "RDT =1?" in step 111 so as to determine the operating state of the return plate 26. If N in step 111, the return plate 26 is held in a state excluding the state shown in FIG. 3A. These plates are not completely returned to the home positions due to some reason. The CPU performs "CKL,RDL OFF" in step 112. The DP 12 is then driven to perform "OUT-OF-ORDER DISPLAY" in step 113.

If Y in step 111, the return plate 26 is returning to the home position. The CPU performs "CKL,RDL OFF" in step 121 and "CM ON" in step 122 to energize the CM 33. A timer arranged in the CPU is started by "120 ms TIMER SET" in step 123. The CPU checks "TIMER END?" in step 124. If Y in step 124, the CPU performs "CM OFF" in step 125 to deenergize the CM 33. The plunger 31 is retracted by instantaneous energization (i.e., 120 msec) of the plunger 31. The CPU performs "CKL,RDL OFF" in step 131 and checks "CKT=1 ?" in step 132 to determine whether the collection plate 25 returns to the home position. If Y in step 132, the CPU checks "RDT=1?" in step 133. If Y in step 133, both the collection plate 25 and the return plate 26 are returning to the home positions and the normal operating state can be restored. The CPU performs "CKL,RDL OFF" in step 134. Therefore, the self diagnosis routine is ended.

If N in step 132 or 133, the collection or return plate has not perfectly returned to the home position, and the flow advances to step 113.

If N in step 103, the return plate 26 has not perfectly returned to the home position. The CPU performs "CKL,RDL OFF" in step 141 and "RM ON" in step 142 to energize the RM 34. In the same manner as in step 123, the CPU performs "120 ms TIMER SET" in step 143. If Y in "TIMER END?" in step 144, the CPU performs "RM OFF" in step 145 to deenergize the RM 34. The return state is checked in the operations from step 131.

Figure 5A:
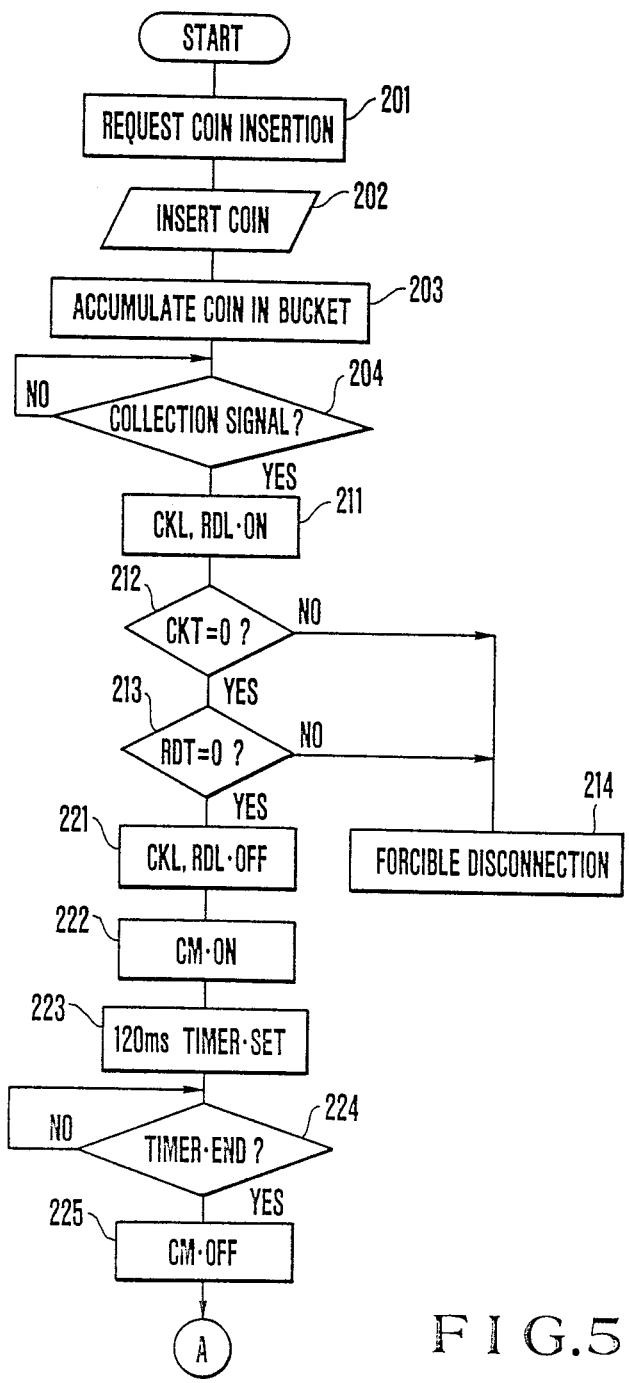

FIG. 5 is a flow chart showing coin accumulation and collection control operations by the CPU. The DP 12 is driven to display "COIN INSERTION REQUEST" in step 201. When the user performs "COIN INSERTION" in step 202 in response to the coin insertion request, "COIN ACCUMULATION INTO BUCKET" is performed in step 203, and the CPU checks "COLLECTION SIGNAL?" from the KSR 1 in step 204. If Y in step 204, the CPU performs "CKL,RDL ON" in step 211. The CPU checks "CKT=0?" in step 212 and "RDT=0?" in step 213. If N in step 212 or 213, the state shown in FIG. 3A is kept unchanged. An illegal behavior using a coin with a string is discriminated. The CPU controls the CB 4 to perform "FORCIBLE DISCONNECTION" in step 214, and the exchange is disengaged from the telephone set.

If Y in steps 212 and 213, the CPU determines that the state shown in FIG. 3B is set. The CPU performs "CKL,RDL OFF" in step 221. The CPU sequentially performs "CM ON" in step 222, "120 ms TIMER SET" in step 223 in the same manner as in step 123, and "CM OFF" in step 225 in response to the affirmative determination of "TIMER END?" in step 224. Meanwhile, the plunger 31 is retracted, and coin collection shown in FIGS. 3C and 3D is performed.

The CPU performs "CKL,RDL ON" in step 231 and checks "CKT=0?" in step 232 and "RDT=1?" in step 233. If Y in steps 232 and 233, the state shown in FIG. 3D is obtained. In order to control the time required to finish charging the capacitor in the PS 3 with a loop current, the CPU performs "1.7s TIMER SET" in step 241. The 1.7s-timer is set in the CPU. In response to the affirmative determination of "TIMER END?" in step 242, the CPU performs "CM ON" in step 243 again. "80 ms TIMER SET" is performed in step 251 in the same manner as in step 123. The time set in step 251 is shorter than that in step 123. In response to the affirmative determination of "TIMER END?" in step 252, the CPU performs "CM OFF" in step 253. The CPU checks "CKT=1?" in step 261 and "RDT=1?" in step 262. If Y in step 261 and 262, the CPU determines that the collection plate 25 and the return plate 26 have returned to the home positions, and the collection operation is ended.

However, if N in step 262, the CPU determines that the return plate 26 has not completely returned to the home position due to some reason. The CPU performs "FORCIBLE DISCONNECTION" in step 263 in the same manner as in step 214.

If N in step 261, it is assumed that the CM 33 is deenergized during bouncing of the collection plate 25 and the collection plate 25 is clamped by the plunger 31, or that the state shown in FIG. 3D is set. The CPU performs "CM ON" in step 271 to "CM OFF" in step 274 in the same manner as in steps 243 to 262. The CPU checks "CKT=1?" in step 281 and "RDT=1?" in step 282. If Y in steps 281 and 282, the CPU determines that the plate has completely returned to the home position.

However, if N in step 281 or 282, the flow advances to step 263.

If N in step 232, it is determined that the collection plate 25 is kept at the home position and an illegal behavior such as use of a stringed coin is detected. In this case, the CPU performs "FORCIBLE DISCONNECTION" in step 301 in the same manner as in step 214.

If N in step 233, it is assumed that the collection plate 25 is not pivoted due to incomplete retraction of the plunger 31. The CPU performs "CM ON" in step 311 to "CM OFF" in step 314 and checks "CKT=0?" in step 321 and "RDT=1?" in step 322 again in the same manner as in step 232 and 233. If Y in steps 321 and 322, the state shown in FIG. 3D is determined to be obtained. The flow advances to step 241.

If N in step 321 or 322, the flow advances to step 263.

The positions of the collection plate 25 and the return plate 26, as shown in FIGS. 3A to 3D, can be checked in the operation sequence. The plunger 31 is controlled by the sequence shown in FIG. 5 and the outputs from the CKT and the RDT are checked. Therefore, the coin accumulation and collection conditions and the positions of the collection plate 25 and the return plate 26 can be directly determined, thereby completely preventing speech communication when an illegal behavior is detected.

Figure 5B:
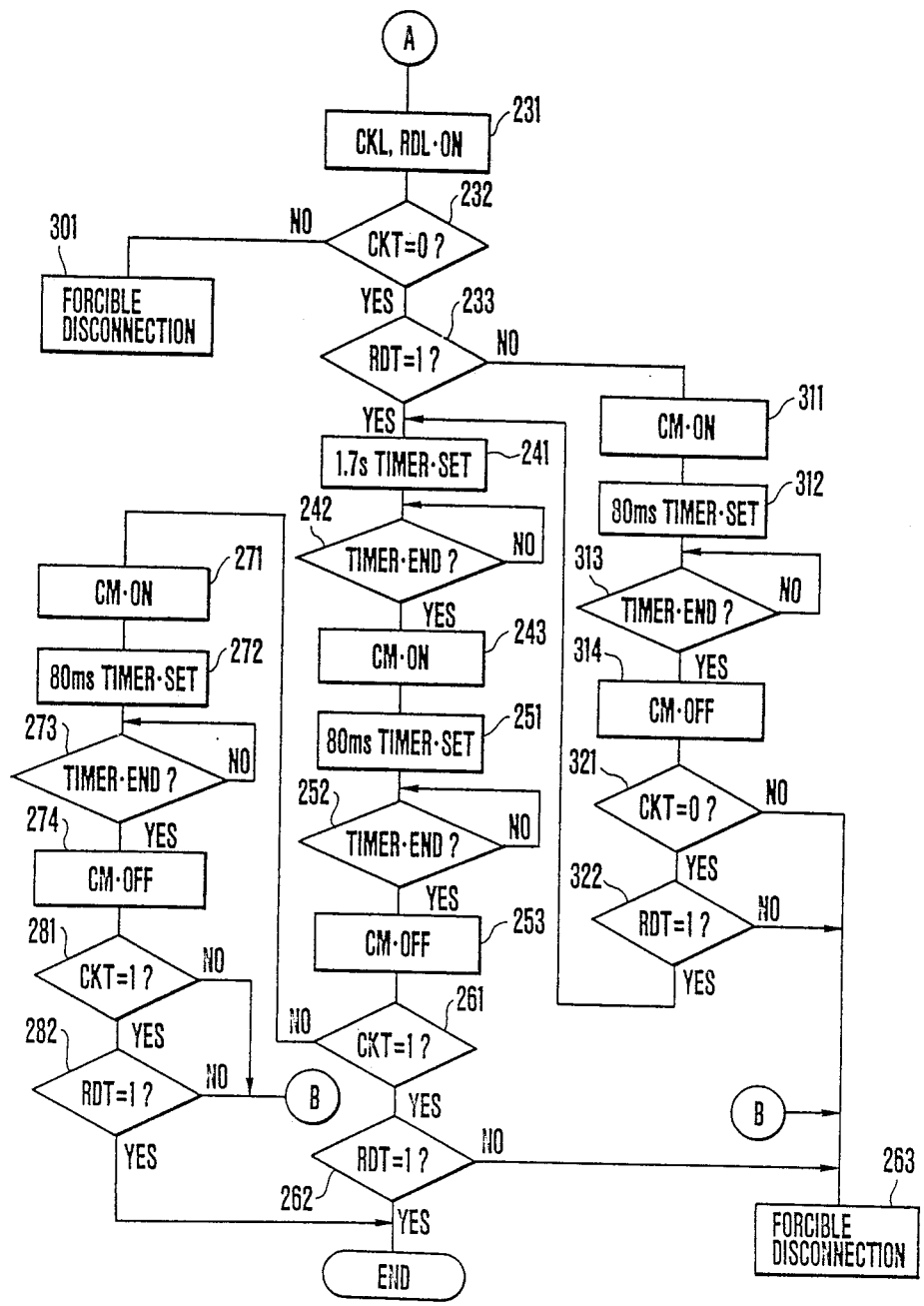

The coin collection operations have been described with reference to FIG. 5. The return operations can be performed in the same manner as in the coin collection operations. The structures and arrangement in Figs. 1A to 2 can be arbitrarily selected according to given conditions. The steps in FIGS. 4 to 5B can be replaced with equivalent steps, reordered, or omitted.

According to the present invention as described above, the operating states of the collection plate and the return plate can be directly detected, and coin accumulation and collection can be accurately discriminated. Incomplete coin collection, incomplete coin return, and incomplete return of the collection and return plates can be perfectly prevented. Typical effects can be obtained in a variety of bucket type coin accumulation apparatuses.

What is claimed is:

1. A bucket type coin accumulation apparatus comprising:

a collection plate and a return plate, both of which constitute a bottom portion of a coin accumulation bucket and cooperate to randomly accumulate coins in said coin accumulation bucket;

locking means for independently locking said collection plate and said return plate when a coin is inserted;

biasing means for independently urging said collection plate and said return plate in a counter-gravity direction by a biasing force smaller than a weight of one coin and for causing said collection and return plates to wait at home positions, respectively;

detecting means for detecting whether said collection plate and said return plate are located at the home positions of said collection plate and said return plate defined by biasing by said biasing means; and display means for displaying an out-of-order state when said detecting means detects in the initial state without any coin deposited that neither said collection plate nor said return plate is located at the home position;

whereby one of said collection plate and said return plate is released by the weight of the accumulated coin upon selective unlocking of said locking means to selectively collect or return the accumulated coin, and the presence/absence of coin accumulation is discriminated by an output from said detecting means.

2. An apparatus according to claim 1, further comprising means for returning one of said collection and return plates which is not located at the home positions when said detecting means determines in the initial state without any coin deposited that said one of said collection and return plates is not located at the corresponding home position.

3. An apparatus according to claim 1, further comprising means for forcibly disconnecting a telephone set from a line when said detecting means detects that one of said collection and return plates is not located at the corresponding home position after the coin is inserted.

4. An apparatus according to claim 1, further comprising means for forcibly disconnecting a telephone set from a line when said detecting means detects that said collection plate is located at the home position after the coin is collected by controlling said locking means.

5. An apparatus according to claim 1, wherein said locking means is controlled to allow a recollection operation of said collection plate when said detecting means detects that said return plate is not located at the home position after said locking means is controlled to collect the coin.

6. An apparatus according to claim 1, wherein said locking means is controlled to allow a second return operation of said collection plate when said detecting means detects that said collection plate is not located at the home position after said locking means is controlled to return said collection plate.

7. An apparatus according to claim 1, wherein the biasing force smaller than the weight of one coin and used for urging said collection plate and said return plate in the counter-gravity direction is applied by weights fixed on said collection and return plates.

8. An apparatus according to claim 1, wherein said locking means is instantaneously released twice at the time of at least one of coin collection and coin return, and said collection or return plate is operated by a first release and returned to the home position by a subsequent release.

9. An apparatus according to claim 8, wherein said locking means comprises a plunger, a capacitor charged by a current for supplying power to said plunger, and a timer for determining the charging time.

* * * * *

UNITED STATES PATENT AND TRADEMARK OFFICE
CERTIFICATE OF CORRECTION

PATENT NO. : 4,841,563
DATED : June 20, 1989
INVENTOR(S) : Sano et al

It is certified that error appears in the above-identified patent and that said Letters Patent is hereby corrected as shown below:

Title page, item number [75], delete "Yoshii" and insert ---- Yoshiki ----.

Column 2, line 2, after "1B" delete ",".

Column 2, line 8, after "and" delete ",".

Column 5, line 29, delete "RL" and insert ---- RDL ----.

Column 5, line 30, delete "(PU" and insert ---- CPU ----.

Column 8, line 3, beginning a paragraph (new element) with "display".

Signed and Sealed this

First Day of January, 1991

Attest:

HARRY F. MANBECK, JR.

*Attesting Officer*     *Commissioner of Patents and Trademarks*